(12) United States Patent
Inoue et al.

(10) Patent No.: US 7,119,164 B2
(45) Date of Patent: Oct. 10, 2006

(54) METHOD FOR PREPARING SULFONATED ORGANIC POROUS MATERIAL

(75) Inventors: Hiroshi Inoue, Tokyo (JP); Koji Yamanaka, Tokyo (JP); Akiko Yoshida, Tokyo (JP); Yusaku Suenaga, Tokyo (JP)

(73) Assignee: Organo Corporation, Tokyo (JP)

( * ) Notice: Subject to any disclaimer, the term of this patent is extended or adjusted under 35 U.S.C. 154(b) by 442 days.

(21) Appl. No.: 10/651,951

(22) Filed: Sep. 2, 2003

(65) Prior Publication Data

US 2004/0087732 A1    May 6, 2004

(30) Foreign Application Priority Data

Sep. 13, 2002  (JP)  .............................. 2002-268407
Oct. 8, 2002   (JP)  .............................. 2002-294586

(51) Int. Cl.
  *C08F 12/08*  (2006.01)
  *C08F 8/36*   (2006.01)
(52) U.S. Cl. ...................... 528/486; 528/487; 528/373; 525/333.9; 525/333.3
(58) Field of Classification Search ................ 528/486, 528/487, 373; 525/333.9, 333.3
See application file for complete search history.

(56) References Cited

U.S. PATENT DOCUMENTS 5,624,875 A    4/1997    Nakanishi et al.
6,290,853 B1   9/2001    Allmer et al.

FOREIGN PATENT DOCUMENTS

JP    3-269160    11/1991

OTHER PUBLICATIONS

U.S. Appl. No. 10/508,008.*
U.S. Appl. No. 10/929,523 (IDS filed on Nov. 18, 2004).*
Derwent Publications, AN 1990-048949, XP-002261474, JP 2-002863, Jan. 8, 1990.
F. Svec, et al., "New Designs of Macroporous Polymers and Supports: From Separation to Biocatalysis", Science, vol. 273, Jul. 12, 1996, pp. 205-211.

* cited by examiner

*Primary Examiner*—Duc Truong
(74) *Attorney, Agent, or Firm*—Oblon, Spivak, McClelland, Maier & Neustadt, P.C.

(57) ABSTRACT

A sulfonated organic porous material in which at least 0.5 mg-equivalent/g (on a dry basis) of sulfonic acid groups has been introduced can be obtained by causing a gaseous substance containing sulfuric anhydride to come in contact with an organic porous material having mesopores existing on the walls of interconnected macropores and having a median radius of 0.01–100 μm and a total pore volume of 1–50 ml/g. This preparation method can ensure the introduction of a large amount of sulfonic acid groups into an organic porous material in a short period of time.

20 Claims, 1 Drawing Sheet

METHOD FOR PREPARING SULFONATED ORGANIC POROUS MATERIAL

BACKGROUND OF THE INVENTION

1. Field of the Invention

The present invention relates to a method for preparing a sulfonated organic porous material comprising an organic porous material with a specific structure with homogeneously introduced sulfonic acid groups.

2. Description of Background Art

As a porous material having a continuous pore structure comprising mesopores existing on the walls of interconnected macropores, an inorganic porous material formed from silica and the like are known (Patent Document 1: U.S. Pat. No. 5,624,875). Development of application of the inorganic porous material as a filler for chromatography has actively been undertaken. However, since this inorganic porous material is hydrophilic, complicated and expensive procedures such as a hydrophobicizing treatment of the surface and the like are required to use it as an adsorbent. In addition, when retained in water for a long period of time, the inorganic porous material releases in water silicate ion produced by hydrolysis of silica. Therefore, it is impossible to use the inorganic porous material as an ion-exchanging material for producing purified water and high purity water. On the other hand, if used as a filler for chromatography, the inorganic porous material has been reported to exhibit remarkably improved performance over conventional particulate fillers. However, since mesopores cannot be greater than 50 μm in size due to the manufacturing method restraints, there has been a restriction imposed on a process in which a material is processed at a large flow rate under a low pressure.

As organic porous materials having continuous pores, porous materials possessing a particle aggregation-type structure have been disclosed in F. Svec, Science, 273, 205–211(1996) (Non-patent Document 1) and other publications. The porous material obtained by this method has a small pore volume and an insufficient mesopore size due to the particle aggregation-type structure. For these reasons, a limitation is imposed on application of the pore material in a process with a large flow rate under a low pressure. In addition, since conventional organic porous materials and porous ion-exchanging materials, made by introducing ion exchange groups into conventional organic porous materials, have many internal structural defects and possess low strength and poor durability against swelling and shrinkage, these organic porous materials exhibit only insufficient separating performance when used as a filler for chromatography. Therefore, development of an organic porous material having a large pore volume and high physical strength, containing pores with a large and uniform pore diameter, being free from internal structural defects such as macrovoids, and having a continuous pore structure has been strongly desired.

Furthermore, manufacture processes of conventional organic porous materials had drawbacks such as significant unevenness in the quality of manufactured products in each production lot and difficulty in reproducing the manufacturing process. Therefore, development of an organic porous material having a large pore volume and high physical strength, containing pores with a large and uniform pore diameter, being free from internal structural defects such as macrovoids, and having a continuous pore structure, as well as development of a manufacturing process that can produce such an organic porous material, has been strongly desired.

On the other hand, as the method for sulfonating organic high molecular weight compounds, a method of sulfonating using fuming sulfuric acid, chlorosulfuric acid, or concentrated sulfuric acid in a liquid phase has been commonly used. Japanese Patent Application Laid-open No. 4-49562 (Patent Document 2) discloses a method of introducing ion exchange groups. This method converts chloromethyl groups and quaternary ammonium groups introduced into an organic porous material having a continuous porous structure into sulfonic acid groups by a functional group conversion reaction. A drawback of this method is that a long time is required for the sulfonation reaction, since the sulfonation agent takes a considerably long period time to infiltrate the porous structure.

Japanese Patent Application Laid-open No. 3-269160 (Patent Document 3) discloses a method of continuously sulfonating polyolefin nonwoven fabrics by a treatment with sulfuric anhydride gas. A sheet-like material can be sulfonated in a comparatively short period of time using this method. However, sulfonated materials are limited to a sheet, fabrics, nonwoven fabrics, and the like. There are no descriptions relating to sulfonation of an organic porous material having a continuous pore structure comprising mesopores existing on the walls of interconnected macropores. Since only the surface of polyolefin nonwoven fabric is sulfonated using the above sulfonation method, only a vary small amount of sulfonic acid groups can be introduced.

Patent Document 1: U.S. Pat. No. 5,624,875 (Summary, claim 1, and Example 7)

Nonpatent Document 1: F. Svec, Science, 1996, vol. 273, 205–211

Patent Document 2: Japanese Patent Publication No. 4-49562 (Example 5)

Patent Document 3: Japanese Patent Application Laid-open No. 3-269160 (claim 1, page 5, left lower column)

A subject to be solved in the present invention is to provide a method for preparing a sulfonated organic porous material capable of homogeneously introducing a large amount of sulfonic acid groups into an organic porous material with a specific structure in a short period of time.

SUMMARY OF THE INVENTION

In view of this situation, the inventors of the present invention have conducted extensive studies. As a result, the inventors have found that if a gaseous substance containing sulfuric anhydride is caused to come in contact with an organic porous material with a specific structure to homogeneously introduce a specific amount of sulfonic acid groups into the organic porous material, a large amount of sulfonic acid groups can be introduced into the organic porous material in a short period of time. In particular, the inventors found that in a process for preparing water-in-oil type emulsion, if the temperature of the water-in-oil type emulsion immediately after preparation is maintained at 35° C. or lower, the organic porous material before introducing sulfonic acid groups can be manufactured with excellent reproducibility at a reduced production cost.

Specifically, an object of the present invention is to provide a method for preparing a sulfonated organic porous material comprising causing a gaseous substance containing sulfuric anhydride to come in contact with an organic porous material having mesopores existing on the walls of interconnected macropores and having a median radius of 0.01–100 μm and a total pore volume of 1–50 ml/g to obtain an organic porous material in which at least 0.5 mg-equivalent/g (on a dry basis) of sulfonic acid groups has been introduced. This preparation method can ensure the introduction of a large amount of sulfonic acid groups into an organic porous material in a short period of time.

DETAILED DESCRIPTION OF THE INVENTION AND PREFERRED EMBODIMENT

Figure 1:
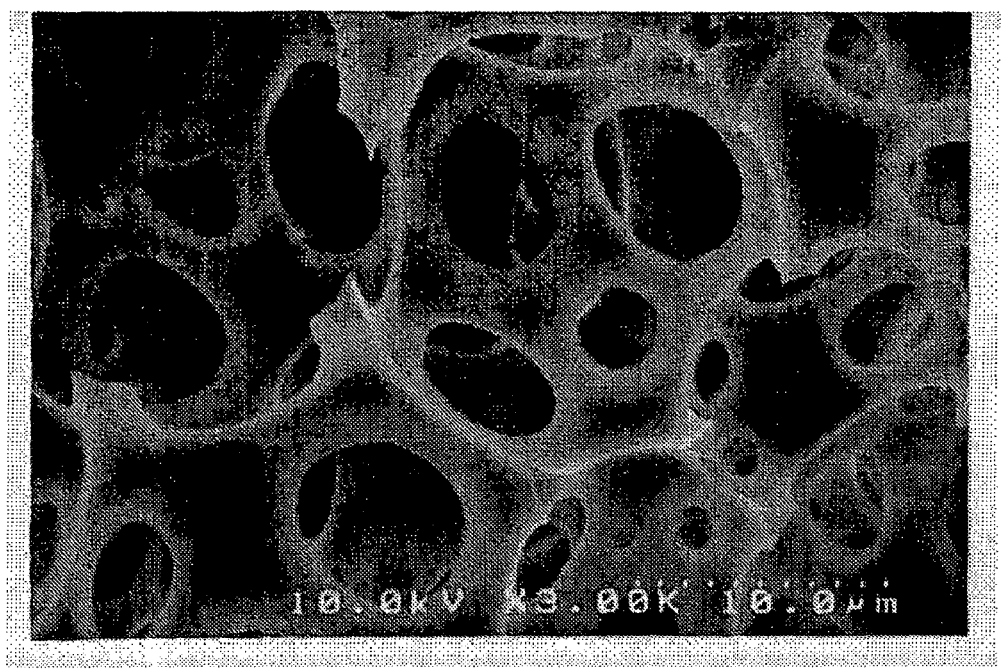
FIG. 1 is an SEM photograph of the organic porous material obtained in Preparation Example 1.

The basic structure of the organic porous material used in the present invention and the sulfonated organic porous material of the present invention is a continuous pore structure having mesopores with a median radius of 0.01–100 μm, preferably 0.1–100 μm, existing on the walls of the interconnected macropores. Specifically, the continuous pore structure usually includes a structure in which macropores with a median radius of 0.2–500 μm are layered. The layered section has mesopores functioning as common openings and has an open pore structure. In the open pore structure, pores formed from the macropores and mesopores become flowing paths when a liquid or gas is caused to flow. The layered macropores usually have 1–12 layers of macropores, with many having 3–10 layers of macropores. Mesopores with a median radius less than 0.01 μm are undesirable because mesopores with a small median radius unduly increase the pressure loss during permeation of a liquid and/or gas. On the other hand, a median radius of mesopores exceeding 100 μm is undesirable because contact between a liquid or gas and the organic ion exchange porous material becomes insufficient, resulting in low adsorption characteristics and ion-exchanging characteristics. The above-described continuous pore structure of the organic porous material and sulfonated organic porous material ensures uniform formation of macropore groups and mesopore groups and, at the same time, remarkably increases the pore volume as compared with particle-aggregation type porous materials described in F. Svec, Science, 273, 205–211 (1996) and the like.

In addition, although not necessarily essential, a sharp mesopore distribution is desirable for high performance and high functionality of the product. Since the structure with a sharp mesopore distribution contains no macrovoids which are structural defective sites, the resulting product not only exhibits increased adsorption characteristics and separation characteristics, but also has increased physical strength and improved durability against swelling and shrinkage. When the half-width of the pore distribution curve divided by the radius of the peak is used as an index for quantifying the mesopores distribution, such a value of 0.5 or less is desirable. Although there are no specific limitations to the method of measuring to obtain a pore distribution curve, a mercury porosimetry method is desirable in view of simple measurement and the size of target mesopores.

In addition, the organic porous material and sulfonated organic porous material have a total pore volume of 1–50 ml/g. If the total pore volume is less than 1 ml/g, the amount of liquid or gas permeating through a unit area becomes small, resulting in low processing capacity. The total pore volume more than 50 ml/g is undesirable because the strength of the organic porous material and sulfonated organic porous material is unduly impaired. The total pore volume of the conventional synthetic porous adsorbent and ion-exchanging materials is in the range of 0.1–0.9 ml/g at most. In the present invention, materials with a greater total pore volume in the range of 1–50 ml/g can be used. When water is used as a liquid and air is used as a gas to permeate the organic porous material or sulfonated organic porous material with a thickness of 10 mm, the organic porous material and sulfonated organic porous material preferably has liquid permeability and gas permeability, in terms of rate of permeation, in the range of 100–100,000 L/min·m²·Mpa and 100–50,000 m³/min·m²·Mpa, respectively. If the total pore volume and the rate of permeation are in the above range, the organic porous material and sulfonated organic porous material can exhibit excellent performance when used as an adsorbent, ion-exchanging material, or filler for chromatography, such as a large contact area with liquids and gases, a smooth flow of liquids and gases, and sufficient mechanical strength.

An organic polymer material having a crosslinking structure is used as the material of skeleton parts that form the continuous pore structure. Such a polymer material preferably contains crosslinking structural units in an amount of 5–90 mol % of the total amount of all structural units forming the polymer material. If the amount of the crosslinking structural units is less than 5 mol %, the mechanical strength is insufficient. If the amount is more than 90 mol %, it is difficult to introduce ion exchange groups, resulting in a product with an insufficient ion exchange capacity. There are no specific limitations to the type of polymer material. Examples include styrene-type polymers such as polystyrene, poly(?-methylstyrene), and poly(vinyl benzyl chloride); polyolefins such as polyethylene and polypropylene; poly(halogenated olefin) such as polyvinyl chloride and polytetrafluoroethylene; nitrile polymers such as polyacrylonitrile; (meth)acrylic polymers such as poly(methyl methacrylate) and poly(ethyl acrylate); styrene-divinylbenzene copolymer, vinyl benzyl chloride-divinylbenzene copolymer, and the like. The above polymers may be either homopolymers obtained by the polymerization of one type of monomer or copolymers obtained by the polymerization of two or more types of monomers. In addition, a blend of two or more polymers may be used. Among these organic polymers, styrene-divinylbenzene copolymer and vinyl benzyl chloride-divinylbenzene copolymer are preferable in view of ease of introduction of ion exchange groups and high mechanical strength. The continuous pore structure of the porous material of the present invention can be easily observed using a scanning electron microscope (SEM).

Next, a method for preparing the sulfonated organic porous material is described. The process comprises preparing a water-in-oil type emulsion by mixing an oil-soluble monomer not containing an ion exchange group, a surfactant, water, and as required, a polymerization initiator using a mixer, and polymerizing the water-in-oil type emulsion. The oil-soluble monomer not containing an ion exchange group indicates a lipophilic monomer that does not contain an ion exchange group such as a carboxylic acid group or sulfonic acid group and has low solubility in water. Specific examples of such a monomer include styrene, α-methylstyrene, vinyl toluene, vinyl benzyl chloride, divinylbenzene, ethylene, propylene, isobutene, butadiene, isoprene, chloroprene, vinyl chloride, vinyl bromide, vinylidene chloride, tetrafluoroethylene, acrylonitrile, methacrylonitrile, vinyl acetate, vinyl propionate, vinyl pivalate, vinyl stearate, methyl acrylate, ethyl acrylate, butyl acrylate, 2-ethylhexyl acrylate, trimethylolpropane triacrylate, butanediol diacrylate, methyl methacrylate, ethyl methacrylate, propyl methacrylate, butyl methacrylate, 2-ethylhexyl methacrylate, cyclohexyl methacrylate, benzyl methacrylate, glycidyl methacrylate, and ethylene glycol dimethacrylate. These monomers can be used either individually or in combination of two or more. However, to obtain the necessary mechanical strength for introducing many sulfonic acid groups in the later step, it is desirable to select a crosslinking monomer, such as divinylbenzene or ethylene glycol dimethacrylate, as at least one monomer component, and incorporate such a monomer in an amount of 1–90 mol %, preferably 3–80 mol % of the total amount of oil-soluble monomers.

There are no specific limitations to the types of surfactant inasmuch as a water-in-oil (w/o) type emulsion can be formed when the oil-soluble monomer not containing an ion exchange group is mixed with water. Nonionic surfactants such as sorbitan monooleate, sorbitan monolaurate, sorbitan monopalmitate, sorbitan monostearate, sorbitan trioleate, polyoxyethylene nonyl phenyl ether, polyoxyethylene stearyl ether, and polyoxyethylene sorbitan monooleate; anionic surfactants such as potassium oleate, sodium dodecylbenzene sulfonate, and dioctyl sodium sulfosuccinate; cationic surfactants such as distearyl dimethyl ammonium chloride; and amphoretic surfactants such as lauryl dimethyl betaine can be used as the surfactant. These surfactants may be used either individually or in combinations of two or more. The term "w/o-type emulsion" refers to an emulsion having a continuous oil phase in which water droplets are dispersed. Although the amount of the above surfactants to be added significantly varies according to the type of oil-soluble monomers and the size of target emulsion particles (macropores), a specific amount of the surfactant can be selected in the range of about 2% to 70% of the total amount of the oil-soluble monomers and surfactants.

In addition, although not necessarily essential, alcohols such as methanol and stearyl alcohol, carboxylic acids such as stearic acid, or hydrocarbon compounds such as octane and dodecane may be added to control the shape and size of foams of the porous polymer. A compound that generates radicals by heat or light is suitably used as the polymerization initiator. The polymerization initiator may be either water-soluble or oil-soluble. Examples include azobisisobutyronitrile, azobiscyclohexanenitrile, azobiscyclohexanecarbonitrile, benzoyl peroxide, potassium persulfate, ammonium persulfate, hydrogen peroxide-iron chloride, sodium persulfate-acidic sodium sulfite, and tetramethylthiuram disulfide. In some reaction systems, polymerization proceeds only by heat or light without the addition of a polymerization initiator. In such a case, the polymerization initiator need not be added.

In forming water-in-oil type emulsions from oil-soluble monomers not containing an ion exchange group, precipitants, surfactants, water, and polymerization initiators, there are no specific limitations to the order of mixing these components. A method of mixing these components all together; a method of separately preparing a mixture of oil-soluble components, which include oil-soluble monomers, precipitants, surfactants, and oil-soluble polymerization initiators, and a solution of aqueous components, which include water and water-soluble polymerization initiators, then mixing the mixture with the solution; and other similar methods can be used.

There are also no specific limitations to the mixer for forming the emulsion. A suitable apparatus for obtaining emulsion having a target particle size can be selected from among conventional mixers, planetary stirring apparatuses, homogenizers, and high-pressure homogenizers. There are also no specific limitations to the mixing conditions. A rate of rotation and stirring time can be arbitrarily determined so that the emulsion having a target particle size can be obtained.

In the present invention, the water-in-oil emulsion immediately after preparation is maintained at a temperature of 35° C. or less, preferably 0–30° C., and still more preferably 10–20° C. before polymerization. This can ensure manufacture of the target organic porous material with excellent reproducibility. If the temperature is more than 35° C., a phase inversion of the emulsion occurs. The resulting emulsion is oil-in-water type, but not water-in-oil type, giving rise to production of polymer particles that are not an organic porous material. Even if an emulsion is formed, such an emulsion is unstable and cannot produce an organic porous material with good reproducibility. Depending on the type of monomers, a water-in-oil emulsion can be obtained at a temperature above 35° C. if emulsion is prepared using a large amount of surfactant while stirring under optimum conditions. Such an emulsion, however, is not stable and exhibits good reproducibility with difficulty. The emulsion temperature control is particularly important in a system having a small surfactant content. A system in which the content of surfactant in the emulsion is 0.5 wt % or less, for example, should be controlled at a temperature of 25° C. or less, and preferably 10–20° C.

There are no specific limitations to the method of controlling the temperature of the water-in-oil emulsion. A method of maintaining the mixture of an oil-soluble monomer not containing an ion exchange group, a surfactant, water, and a polymerization initiator at a temperature of 35° C. or less before stirring, a method of cooling the mixture to a prescribed temperature or below while stirring, and the like can be given. Of these methods, the method of maintaining the mixture at 35° C. or less before stirring, specifically, a method of using water at a temperature of 5–35° C. as the raw water for preparing the water-in-oil emulsion is preferable, since the mixture can be brought to a temperature close to the temperature of water that is used in a large amount. An additional advantage of this method is easy temperature control of emulsion immediately after preparation, since a temperature rise due to stirring in the following step can be determined by experience if water is used for adjusting the temperature. There are no specific limitations to the duration for which the temperature is maintained at 35° C. or less immediately after preparation of water-in-oil emulsion. Although it is sufficient that the water-in-oil emulsion as prepared be maintained in this temperature range, the emulsion is preferably maintained at that temperature until the polymerization is initiated.

Various polymerization conditions can be selected for polymerizing the obtained water-in-oil type emulsion according to the type of monomers and polymerization initiators. For example, when azobisisobutyronitrile, benzoyl peroxide, potassium persulfate, or the like is used as the polymerization initiator, the emulsion may be polymerized with heating at 30–100° C. for 1–48 hours in a sealed vessel under an inert gas atmosphere. When hydrogen peroxide-iron chloride, sodium persulfate-acidic sodium sulfite, or the like is used as the polymerization initiator, the emulsion may be polymerized at 0–30° C. for 1–48 hours in a sealed vessel under an inert gas atmosphere. Although there is no specific limitation to the polymerization conversion rate of the oil-soluble monomers, a conversion rate of about 70% or more is preferable to maintain the shape of the organic porous material stable. After the polymerization, the reaction mixture is removed from the reaction vessel and, if necessary, extracted with a solvent such as isopropanol to remove unreacted monomers and surfactants, thereby obtaining an organic porous material.

The sulfonated organic porous material of the present invention can be obtained by causing the organic porous material to come into contact with a gaseous substance containing sulfuric anhydride. Sulfuric anhydride contained in the gaseous substance is also referred to as sulfur trioxide ($SO_3$) and a commercially available product, for example, can be used. There are no specific limitations to gaseous components other than sulfuric anhydride contained in the gaseous substance inasmuch as such components are inert to the sulfonation reaction. Dry air, nitrogen, and argon can be given as examples. The concentration of sulfuric anhydride in the gaseous substance largely depends on the conditions of contact, the pore structure of organic porous material, the amount of sulfonic acid groups introduced, but a range of about 1–50% is preferable. If the concentration of sulfuric anhydride is less than 1%, the sulfonation reaction does not proceed. An unnecessarily long time is required for the reaction to introduce sulfonic acid groups in the amount of 0.5 mg equivalent/g of dry porous material. If more than 50%, the reaction mixture is difficult to handle due to high corrosivity.

There are no specific limitations to method of causing the organic porous material to come into contact with a gaseous substance containing sulfuric anhydride. A continuous contact method and batch contact method can be given, for example. The batch contact method is preferable for sulfonating organic porous materials of various shapes. Although the sulfonation reaction conditions largely depends on the pore structure of organic porous material and the amount of sulfonic acid groups introduced, the reaction conditions are appropriately selected from the reaction time in the range from 10 minutes to 10 hours and the temperature range of 20–100° C. A sulfonated organic porous material with sulfonic acid groups introduced in the amount of at least 0.5 mg-equivalent/g on a dry basis can be obtained by appropriately selecting the concentration of sulfuric anhydride in the gaseous substance, the reaction time, and reaction temperature from the above range. After the reaction, the reaction product is charged into a large amount of water and washed with water.

The sulfonated organic porous material produced by the method of the present invention contains sulfonic acid groups homogeneously introduced in the amount of at least 0.5 mg-equivalent/g, and preferably 1.0–5.0 mg-equivalent/g on a dry basis. If the amount of sulfonic acid groups introduced is less than 0.5 mg-equivalent/g of dry porous material, the ion-exchanging capacity is insufficient. If the distribution of sulfonic acid groups is not uniform, problems such as fluctuation in the ion-exchanging reaction, a decrease in the rate of ion separation, and difficulty in performing high speed ion exchange processing occur. The term "uniform distribution of sulfonic acid groups in the porous material" herein indicates uniformity of sulfonic acid group distribution in the order of µm or less. Distribution conditions of sulfonic acid groups can be easily identified by using an analytical technique such as EPMA.

EXAMPLES

The present invention will be described in more detail by examples, which should not be construed as limiting the present invention.

Preparation Example 1

(Preparation of Organic Porous Material (I))

Styrene (16.2 g), divinylbenzene (4.1 g), sorbitan monooleate (2.2 g), and azobisisobutyronitrile (0.24 g) were mixed and homogeneously dissolved. The mixture of styrene, divinylbenzene, sorbitan monooleate, and azobisisobutyronitrile was added to purified water (180 g) cooled at 5° C. A water-in-oil type emulsion was obtained by processing the mixture using a planetary agitator (Vacuum agitation defoaming mixer, manufactured by EME Co., Ltd.) under the conditions of pressure: 13.3 kPa, revolution (rotation around a revolution axis): 1000 rpm, rotation: 330 rpm, and process time: 2 minutes. The temperature of the water-in-oil type emulsion immediately after preparation was 14° C. After the emulsification, the reaction system was sufficiently replaced with nitrogen and the emulsion was allowed to stand still to polymerize at 60° C. for 24 hours. After the polymerization, the reaction mixture was extracted with isopropanol for 18 hours using a Soxhlet extractor to remove unreacted monomers, water, and sorbitan monooleate, and dried overnight at 85° C. under reduced pressure. The organic porous material (I) of styrene/divinylbenzene copolymer containing 14 mol % of a crosslinking component thus obtained had a continuous porous inner structure with uniformly sized macropores and mesopores.

Preparation Example 2

(Preparation of Organic Porous Material (II))

The same experiment as in Preparation Example 1 was carried out to confirm reproducibility. As a result, an organic porous material (II) nearly the same as the organic porous material (I) obtained in Preparation Example 1 was obtained.

Preparation Example 3

(Preparation of Organic Porous Material (III))

The same experiment as in Preparation Example 1 was carried out to confirm reproducibility. As a result, an organic porous material (III) nearly the same as the organic porous material (I) obtained in Preparation Example 1 was obtained.

Preparation Example 4

(Preparation of Organic Porous Materials (IV)–(VI))

Emulsions were prepared in the same manner as in preparation Example 1 except that the temperature of purified water and the temperature of water-in-oil emulsion immediately after preparation were changed as shown in Table 1. These emulsions were polymerized in the same manner as in Preparation Example 1 to obtain organic porous materials (IV)–(VI) having a continuous porous structure.

Some of the preparation conditions and the results of the Preparation Examples 1–6 are shown in Table 1.

TABLE 1

|  | Temperature of purified water (° C.) | Liquid temperature right after emulsion preparation (° C.) | Emulsion form | Form after polymerization |
|---|---|---|---|---|
| Preparation Example 1 | 5 | 14 | Water-in-oil type | Porous material (continuous porous structure) |
| Preparation Example 2 | 5 | 14 | Water-in-oil type | Porous material (continuous porous structure) |
| Preparation Example 3 | 5 | 14 | Water-in-oil type | Porous material (continuous porous structure) |
| Preparation Example 4 | 10 | 20 | Water-in-oil type | Porous material (continuous porous structure) |
| Preparation Example 5 | 15 | 24 | Water-in-oil type | Porous material (continuous porous structure) |
| Preparation Example 6 | 20 | 28 | Water-in-oil type | Porous material (continuous porous structure) |

Example 1

(Preparation of Organic Porous Material (VII))

Styrene (16.2 g), divinylbenzene (4.1 g), sorbitan monooleate (1.1 g), and azobisisobutyronitrile (0.24 g) were mixed and homogeneously dissolved. The mixture of styrene, divinylbenzene, sorbitan monooleate, and azobisisobutyronitrile was added to purified water (180 g) cooled at 5° C. A water-in-oil type emulsion was obtained by processing the mixture using a planetary agitator (Vacuum agitation defoaming mixer, manufactured by EME Co., Ltd.) under the conditions of pressure: 13.3 kPa, revolution (rotation around a revolution axis): 1600 rpm, rotation: 530 rpm, and process time: 4 minutes. After the emulsification, the reaction system was sufficiently replaced with nitrogen and the emulsion was allowed to stand still to polymerize at 60° C. for 24 hours. After the polymerization, the reaction mixture was extracted with isopropanol for 18 hours using a Soxhlet extractor to remove unreacted monomers, water, and sorbitan monooleate, and dried overnight at 85° C. under reduced pressure. The inner structure of the organic porous material (VII) of the styrene/divinylbenzene copolymer containing 14 mol % of a crosslinking component was inspected by SEM. The results are shown in FIG. 1. As is clear from FIG. 1, the organic porous material has a continuous porous structure and contains macropores and mesopores, respectively having a uniform size.

(Preparation of Sulfonated Organic Porous Material)

The organic porous material (VII) obtained above was cut into a piece with a size of 50 mm×50 mm×10 mm and put into a 1 l autoclave. A previously prepared mixed gas of 8% sulfuric anhydride (manufactured by Aldrich Co.) and 92% of dry air at 80° C. was introduced into the autoclave to cause the organic porous material (VII) to contact with the gas for 30 minutes while maintaining the flow rate at 500 ml/min. After the reaction, the reaction product was poured into a large amount of water. A sulfonated organic porous material (I) was obtained by washing the product with water. The ion exchange capacity of the sulfonated organic porous material was 2.7 mg-equivalent/g on a dry basis. Sulfur atom mapping by EPMA confirmed that the porous material contained sulfonic acid groups uniformly dispersed therein.

Example 2

A sulfonated organic porous material (II) was obtained by reacting the organic porous material (VII) and sulfuric anhydride gas in the same manner as in Example 1, except that the contact time of 30 minutes was extended to two hours. The ion exchange capacity of the sulfonated organic porous material (II) was 4.5 mg-equivalent/g of dry organic porous material. Sulfonic acid groups were distributed uniformly.

Comparative Example 1

(Preparation of Sulfonated Organic Porous Material by Liquid Phase Reaction)

The organic porous material (VII) prepared in Example 1 was cut into a piece with a size of 50 mm×50 mm×10 mm. Dichloroethane (800 ml) was added and heated at 60° C. for 30 minutes. After cooling to room temperature, chlorosulfuric acid (35.0 g) was slowly added and the mixture was reacted at room temperature for 24 hours. After the reaction, acetic acid was added and the mixture was poured into a large amount of water. A sulfonated organic porous material was obtained by washing the product with water. The ion exchange capacity of the resulting sulfonated organic porous material was 3.8 mg-equivalent/g of dry organic porous material.

Comparing the results of Examples 1 and 2 with the results of Comparative Example 1, the time required to contact the materials for obtaining a certain ion exchange capacity in Examples 1 and 2 was found to be greatly shorter (about 1/20) than the time required for obtaining an almost the same ion exchange capacity in Comparative Example 1.

As clear from the above description, the method for preparing a sulfonated organic porous material of the present invention can homogeneously introduce sulfonic acid groups into an organic porous material a short period of time as compared with conventional methods. The method can thus achieve significant improvement of the production efficiency. In addition, since sulfonic acid groups can be introduced in an amount larger than in conventional methods and the organic porous material has a specific structure, the sulfonated organic porous material can exhibit high performance when used as a filter, adsorbent, substitute for existing ion-exchanging materials, EDI filler, filter for ion chromatography, reverse phase liquid chromatography, and normal phase liquid chromatography, and solid acid/base catalyst.

What is claimed is:

1. A method for preparing a sulfonated organic porous material comprising causing a gaseous substance containing sulfuric anhydride to come in contact with an organic porous material having mesopores existing on the walls of interconnected macropores and having a median radius of 0.01–100 μm and a total pore volume of 1–50 mug to obtain an organic porous material in which 2.7–5.0 mg-equivalent/g (on a dry basis) of sulfonic acid groups has been introduced.

2. The method according to claim 1, wherein the organic porous material is obtained by a process comprising mixing an oil-soluble monomer not containing an ion exchange group, a surfactant, water, and as required, a polymerization initiator, stirring the mixture to prepare a water-in-oil type emulsion with a temperature of 35° C. or less immediately after preparation, and polymerizing the water-in-oil type emulsion.

3. The method according to claim 2, wherein the temperature of the mixture is adjusted to 35° C. or less before stirring.

4. The method according to claim 2, wherein the water at a temperature of 5–30° C. is used as the water component used for the mixture before stirring.

5. The method according to claim 1, wherein the gaseous substance containing sulfuric anhydride is a mixture of dry air and sulfuric anhydride.

6. The method according to claim 1, wherein the amount of sulfuric anhydride in the gaseous substance is 1–50%.

7. The method according to claim 1, wherein 2.7–4.5 mg-equivalentlg (on a dry basis) of sulfonic acid groups has been introduced.

8. The method according to claim 1, wherein the organic porous material is a polystyrene porous material.

9. The method according to claim 7, wherein the organic porous material is a polystyrene porous material.

10. The method according to claim 1, wherein the sulfonic acid groups are uniformly distributed in the porous material.

11. The method according to claim 2, wherein the sulfonic acid groups are uniformly distributed in the porous material.

12. The method according to claim 3, wherein the sulfonic acid groups are uniformly distributed in the porous material.

13. The method according to claim 4, wherein the sulfonic acid groups are uniformly distributed in the porous material.

14. The method according to claim 5, wherein the sulfonic acid groups are uniformly distributed in the porous material.

15. The method according to claim 6, wherein the sulfonic acid groups are uniformly distributed in the porous material.

16. The method according to claim 7, wherein the sulfonic acid groups are uniformly distributed in the porous material.

17. The method according to claim 8, wherein the sulfonic acid groups are uniformly distributed in the porous material.

18. The method according to claim 9, wherein the sulfonic acid groups are uniformly distributed in the porous material.

19. The method according to claim 2, wherein the organic porous material is a polystyrene porous material and wherein 2.7–4.5 mg-equivalent/g (on a dry basis) of sulfonic acid groups has been introduced.

20. The method according to claim 3, wherein the organic porous material is a polystyrene porous material and wherein 2.7–4.5 mg-equivalent/g (on a dry basis) of sulfonic acid groups has been introduced.

* * * * *